S. FACHINI.
COMBUSTION OF LIQUID FUELS.
APPLICATION FILED SEPT. 26, 1916.
1,252,793.
Patented Jan. 8, 1918.
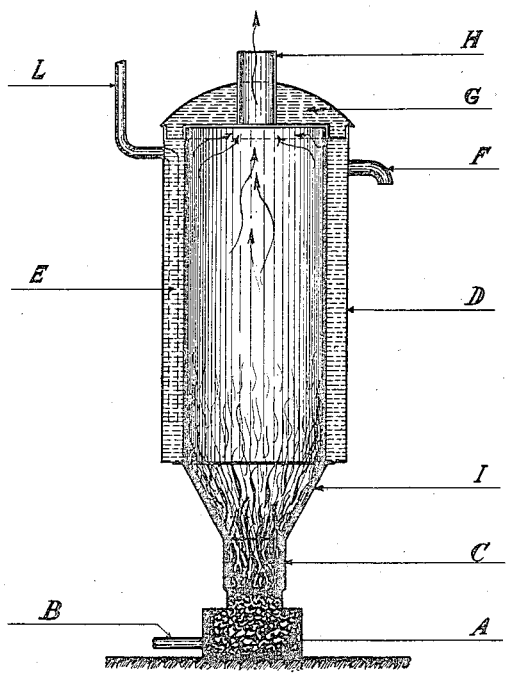
Inventor:
per Stefano Fachini
H. W. Plucker
Attorney.

UNITED STATES PATENT OFFICE.

STEFANO FACHINI, OF MILAN, ITALY.

COMBUSTION OF LIQUID FUELS.

1,252,793.

Specification of Letters Patent.

Patented Jan. 8, 1918.

Application filed September 26, 1916. Serial No. 122,244.

*To all whom it may concern:*

Be it known that I, STEFANO FACHINI, chemist, subject of the King of Italy, resident of Milan, in the Kingdom of Italy, No. 45 Via Monforte, have invented new and useful Improvements in the Combustion of Liquid Fuels, of which the following is a specification.

My invention relates to a process of and means for burning liquid fuel and it has for its primary object to obtain a complete combustion of such fuel.

Other objects of my invention are to divide very finely an initial amount of liquid fuel and use the heat given off by the combustion thereof to vaporize further amounts of fuel before these are ignited; to promote the combustion by means of a strong draft; to provide a compact and efficient heater whereby a perfect combustion of liquid fuel will be obtained, and to provide a heater of this type which will be adapted for use at home as well as in industrial plants.

To the accomplishment of these objects I cause the liquid fuel to be absorbed by a mass of porous incombustible material composed of dry bones previously freed from grease and gelatin, and placed in a suitable receptacle open at the top. When the liquid exuding from the exposed surface of such mass is ignited, the absorbed fuel is caused to vaporize and burn in a uniform manner, without producing any smoke, as it pours out of the porous mass in a steady flow. To promote the combustion I fit on the top of the burner a flue flaring outwardly, whereby the ascending combustion gases are caused to expand gradually and draw in air for the combustion of fresh quantities of fuel through apertures provided in the flue adjacent the exposed surface of the porous mass.

Reference will now be had to the accompanying drawing in which the invention is shown as being embodied in a bath heater.

A is the burner which contains the porous substance imbued with the liquid fuel; the latter, for maintaining the porous substance properly impregnated, can flow continually through the tubing B, which is connected with a fuel container; the flow of the combustible is regulated by cocks or outflow regulators provided on the container. As stated above, the porous mass consists of dry bones previously freed from grease and gelatin, which substance, I have discovered, has such remarkable absorbing properties that in spite of its low heat conducting power it is suitable for conveying heavy oils as well as lighter fuels from the bottom to the top of the receptacle. Furthermore, this poor heat conducting power of the porous mass employed removes any danger of explosion due to premature ignition, as the fuel is not vaporized until it reaches the top portion of the receptacle.

C is the pipe which acts as a cap over the outlet of the burner; this pipe can be constructed in the shape of a funnel or the like, having an upwardly enlarged portion I.

Over this enlarged portion a double wall recipient D is arranged which contains the liquid E to be heated.

The products of the combustion flow along the internal face of the pipe D as shown by the arrows, and transmit the heat to the water to be warmed.

F is a cock for discharging the heated water.

On the top of the pipe D a cover G with double wall can be arranged, a pipe H being provided, which traverses it axially for the exhaust of the products of the combustion.

A pipe L serves for feeding the water in the recipient D. The lower portion of the pipe C can completely encircle the outlet of the burner; in this case this portion is advantageously provided with openings all around it.

The process and the burner thereto can be variously employed in heaters for home and industrial uses as stoves, heaters, bath heaters, vapor generators and the like.

The most proper porous and incombustible substance to be used in connection with said process are bones. The bones after having been scoured and rendered free from gelatin and finally desiccated, thereby losing from 40% to 50% of their original weight, form a very porous substance capable to absorb rapidly a good quantity of liquid fuel and transform it into gas; the fuel can be fed thereto in a continual way.

Having now described my invention, and how the same is to be carried out, what I claim as my invention, is:

1. In a burner for liquid fuels, the combination of a receptacle open at the top, a supply pipe for liquid fuel at the bottom of said receptacle, a supply of air adjacent the opening in the top of said receptacle, and an absorbent mass in said receptacle comprised of dry bones previously freed from grease and gelatin, said mass constituting a heat barrier between the top and bottom portions of said receptacle.

2. In a burner for liquid fuels, the combination of a receptacle open at the top, a supply pipe for liquid fuel at the bottom of said receptacle, a flue comprising a perforated cylindrical portion fitting the top of said receptacle and an outwardly flaring portion on top of said cylindrical portion, and an absorbent mass in said receptacle composed of dry bones previously freed from grease and gelatin, said mass constituting a heat barrier between the top and bottom portions of said receptacle.

In testimony whereof I affix my signature.

STEFANO FACHINI.

Copies of this patent may be obtained for five cents each, by addressing the "Commissioner of Patents, Washington, D. C."